April 25, 1967  W. C. CONKLING  3,315,523
MAGNETIC COUPLING FOR A FLOWMETER
Filed Jan. 31, 1964  3 Sheets-Sheet 1
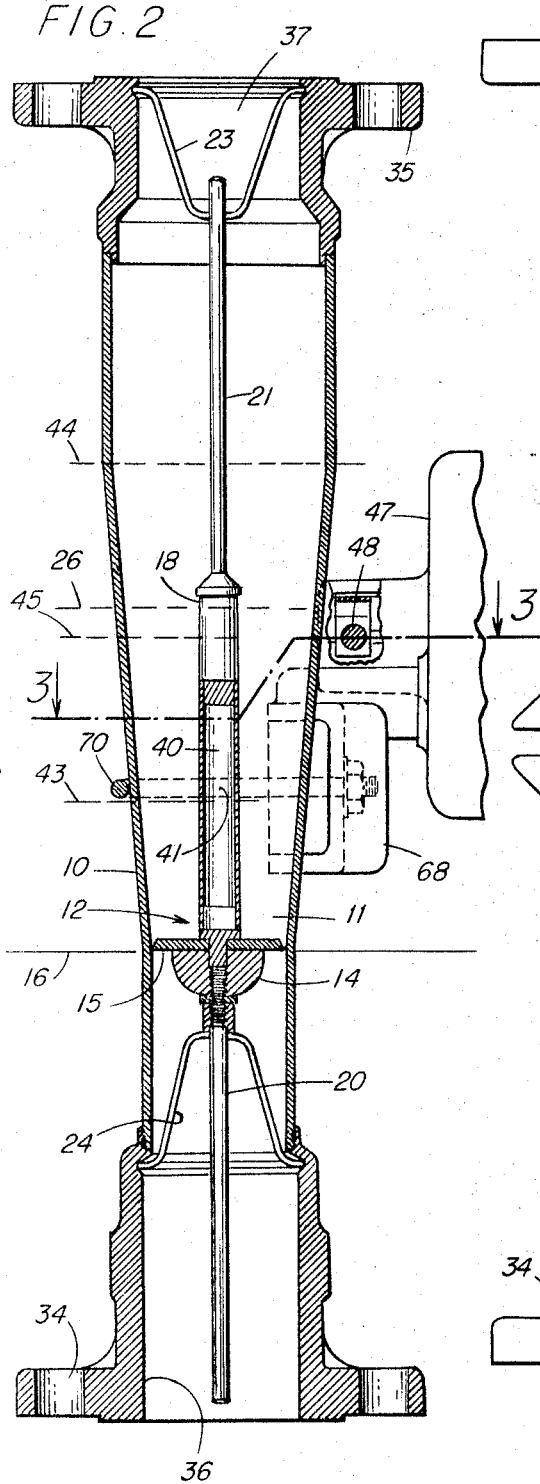
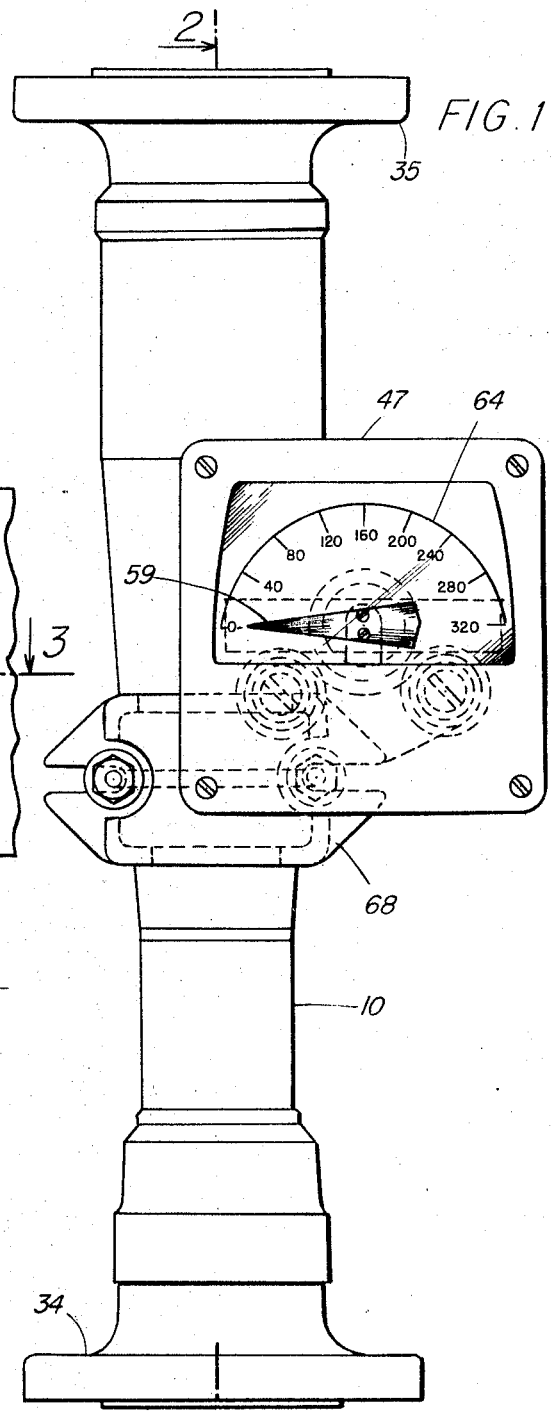
INVENTOR.
William C. Conkling
BY
Robert S. Dunham
Attorney April 25, 1967 W. C. CONKLING 3,315,523
MAGNETIC COUPLING FOR A FLOWMETER
Filed Jan. 31, 1964 3 Sheets-Sheet 2

INVENTOR.
William C. Conkling
BY
Robert S. Dunham
Attorney

April 25, 1967 W. C. CONKLING 3,315,523
MAGNETIC COUPLING FOR A FLOWMETER
Filed Jan. 31, 1964 3 Sheets-Sheet 3
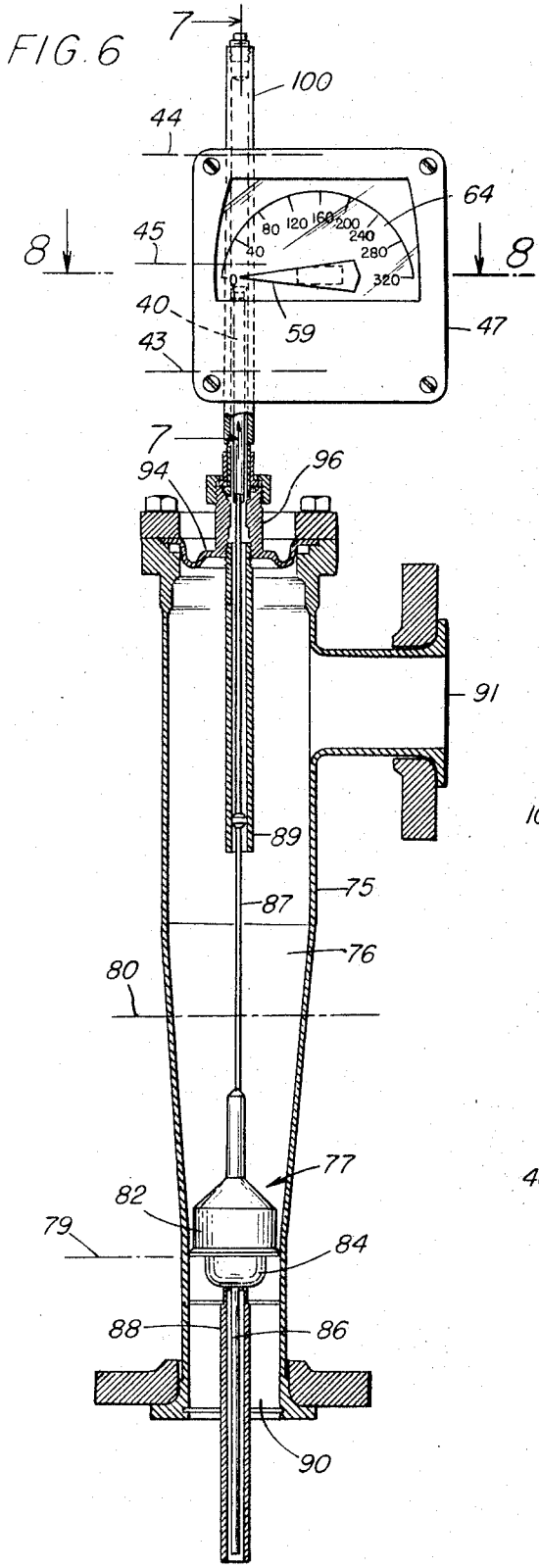
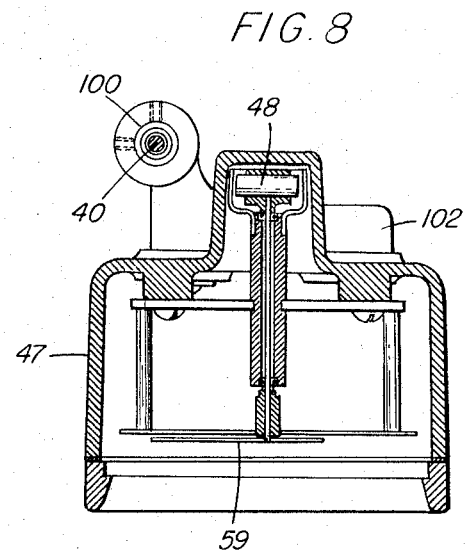
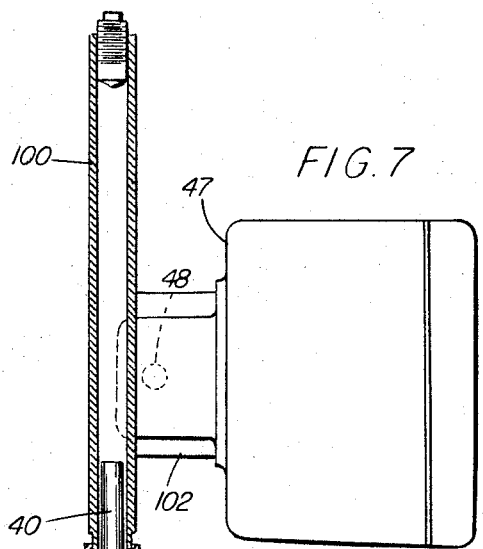
INVENTOR.
William C. Conkling
BY
Robert S. Dunham
Attorney United States Patent Office 3,315,523
Patented Apr. 25, 1967

3,315,523
MAGNETIC COUPLING FOR A FLOWMETER
William C. Conkling, Essex Fells, N.J., assignor to Wallace & Tiernan Inc., Belleville, N.J., a corporation of Delaware
Filed Jan. 31, 1964, Ser. No. 341,606
12 Claims. (Cl. 73—209)

This invention relates to apparatus for indicating the position of a movable object or element that travels along a defined path, and in particular to apparatus adapted to indicate the position of an element such as a meter float that travels within a laterally enclosed passage. More particularly it relates to such apparatus having an indicator magnetically coupled to the movable element and disposed to provide the desired position indication at a locality external to the passage or path of element travel. In one important specific aspect the invention is directed to apparatus for indicating the flow rate of fluid through a so-called variable area flowmeter by registering the position of a float which undergoes rectilinear displacement, within the meter, proportional to such rate of flow.

In various types of metering and other devices it is necessary to determine accurately and continuously the position of an element that undergoes displacement along an enclosed rectilinear path. By way of specific illustration, in a common form of variable area flowmeter the fluid flow rate to be measured is indicated by the position of a metal float element that is guided for free vertical movement in an upright, downwardly-tapering tube. The fluid, flow of which is to be measured, enters at the bottom of the tube and departs at the top. The float rises with increase in rate of fluid flow, assuming a position which at any instant corresponds to the flow rate at such instant.

Sometimes these devices have transparent tubes to enable direct observation of the float position, but such direct observation is often inconvenient or impracticable, as when for particular purposes the tube must be made of metal or other opaque material. It is then necessary to provide means for registering the float position (as an indication of flow rate) at a locality external to the tube. Mechanical coupling of an external indicator mechanism to the float is generally unsatisfactory, since frictional and other loads thereby imparted to the float tend to distort the flow rate readings by interfering with the free motion of the float.

It has accordingly been proposed to provide magnetic coupling of the float to an external indicator, e.g. by employing a magnet carried with the float and an externally positioned magnetic follower which moves under the influence of the float-magnet field, as the float is displaced, to register float displacement. In magnetically coupled indicator systems of this type it is particularly important, for accuracy of flow rate measurement, that the indicator (i.e. magnetic follower) motion be linearly proportional to the displacement of the float (which displacement is itself a substantially linear function of the flow rate) over a wide range of float positions. It is also important that the motion of the indicator within this range traverse a relatively long scale, i.e. that the displacement of the indicator per unit float displacement be of substantial magnitude, again for accuracy and ease of readings.

The magnetic coupling strength should also be sufficient to overcome distortions in indicator movement due to frictional forces in the working parts of the indicator mechanism. Since the design and dimensions of conventional variable area flowmeters necessitate fairly wide spacing between the float magnet and indicator magnetic follower, a coupling strength of substantial magnitude is required; but the coupling strength should not be so large as to exert significant lateral force on the float, which could introduce motion-distorting friction between the float assembly and adjacent parts of the meter tube. The indicator should also assume one and only one position for each position of the float in the tube, regardless of the starting position of the float or sudden float motion due to flow surges. Moreover, for ease and economy of construction, the indicator arrangement should be structurally simple and compact, with magnetic and mechanical elements of minimum weight and size to conserve cost and space.

It will be appreciated that magnetically coupled indicator arrangements of the type referred to above may also be employed in various other forms of equipment to indicate rectilinear displacement of an element along a defined path, and that the foregoing considerations (e.g. with respect to the importance of linear operation and wide range or large extent of indicator travel) are generally applicable to such arrangements wherever employed.

An object of the present invention is to provide a new and improved form of magnetically coupled element-position-indicating apparatus, adapted to register continuously (at a locality external to the path of element travel) the position of a movable element along a rectilinear path of ascertained length, and in particular affording readings of advantageously superior accuracy over a substantial range of element positions. Another object is to provide such apparatus wherein the external indicator displacement is linearly proportional to the displacement of the element over a wide range of element positions, and wherein the indicator displacement per unit element displacement within the latter range is of substantial magnitude, affording a long indicator scale with uniformity or linearity of readings throughout the scale. A further object is to provide such apparatus which is simple, compact, and economical in construction, and exhibits high reliability and repeatability of indications regardless of element starting position or sudden element motion.

Yet another object is to provide apparatus of the foregoing character adapted for use in variable area flowmeters and having magnetic coupling strength appropriate for use in such devices. A still further object is to provide a variable area flowmeter affording flow rate indications of superior accuracy, for a substantial range of flow rates, at a locality external to the flowmeter tube.

The indicating apparatus of the present invention broadly includes a first bar magnet carried by a rectilinearly movable element (e.g. a flowmeter float) for axially directed rectilinear displacement therewith, and a second bar magnet, pivoted for rotation about its midpoint in a plant of rotation containing its magnetic axis, and positioned in spaced relation to the path of the first magnet with its axis of rotation lying in the plane perpendicularly bisecting the latter path. This second magnet is the external follower of the apparatus, being magnetically coupled to the first magnet so as to undergo angular displacement responsive to motion of the first magnet and thereby to provide indication of the position of the movable element. Important features of the invention reside in the relative lengths and placement of the two magnets in such apparatus; in a particular sense, the invention contemplates certain specific limits or ranges of values for the length of the second magnet relative to that of the first, the length of the first magnet relative to its path length, and other dimensional relationships involving the placement and spacing of the magnets, it having been found that the selection of apparatus dimensions within these limits or ranges results in the attainment of markedly superior linearity of indicator response, together with other significant advantages.

These and other features and advantages of the invention will be apparent from the detailed description hereinbelow set forth, together with the accompanying drawings, wherein:

FIG. 1 is an elevational view of a variable area flowmeter incorporating the apparatus of the present invention in an exemplary embodiment;

FIG. 2 is an enlarged sectional view taken along the line 2—2 of FIG. 1;

FIG. 6 is an elevational view of a modified form of flowmeter incorporating an embodiment of the apparatus of the present invention;

FIG. 7 is an enlarged sectional view taken along the line 7—7 of FIG. 6; and

FIG. 8 is a sectional view taken along the line 8—8 of FIG. 7.

Figures 3, 4, 5:
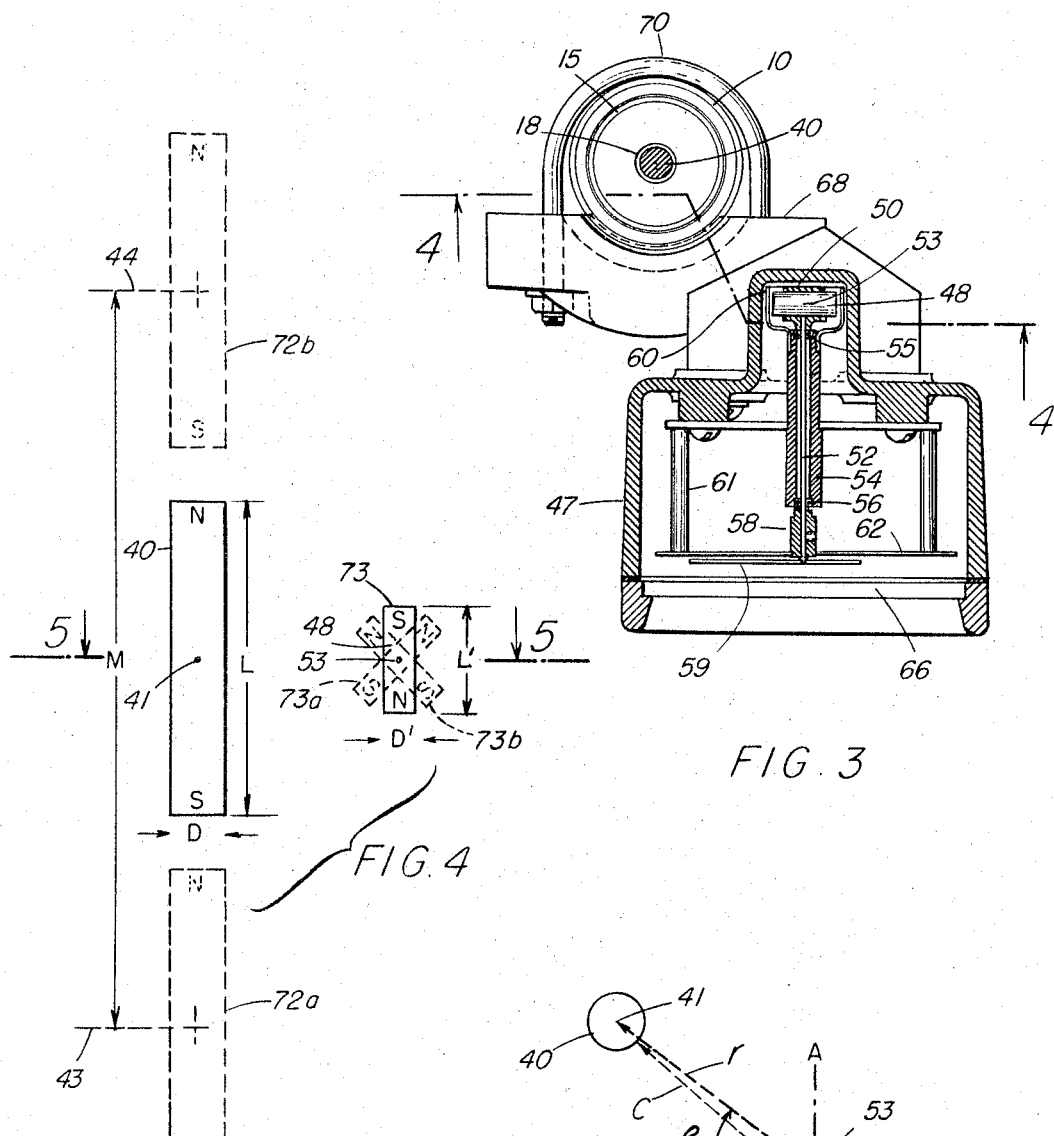
FIG. 3 is a sectional view taken along the line 3—3 of FIG. 2.
FIG. 4 is a simplified diagrammatic elevational view taken as along the line 4—4 of FIG. 3 and illustrating certain relationships between the magnetic elements of the apparatus of FIGS. 1–3.
FIG. 5 is a diagrammatic view taken as along the line 5—5 of FIG. 4 and showing further relationships between the elements illustrated in FIG. 4.

Referring first to FIGS. 1–3, the apparatus of the invention in the form shown is illustrated as incorporated in a conventional form of variable area flowmeter for measuring the flow rate of liquid advancing in continuous flow as through a conduit system (not shown). The flowmeter broadly comprises an open-ended meter tube 10, e.g. of metal, defining an axially vertical passage 11 of downwardly tapering, elongate frusto-conic configuration, within which a metal float 12 is positioned for guided motion along a vertical rectilinear path coincident with the passage axis. As hereinafter more fully explained, when fluid is flowing through the passage 11, the float 12 assumes a position in the passage which at any instant is uniquely determined by the rate of fluid flow through the passage at such instant, so that the float position provides an indication or measurement of this flow rate.

The float 12 includes a float body 14 having a disc-shaped float head portion 15 with a diameter slightly smaller than the diameter of the passage 11 at a preselected lower level 16 therein, and further having a cylindrical portion 18 extending upwardly from the float head along the passage axis. A pair of vertical guide rods 20, 21, carried by the float, respectively extend above and below the float body along the passage axis through guide spiders 23, 24 which are respectively mounted in the upper and lower ends of the passage 11. The spiders are adapted to permit vertical movement of the guide rods while preventing lateral displacement of the rods, and also act as stops establishing upper and lower limits of vertical float movement in the passage. Specifically, the spider 24 is positioned to engage the lower end of the float body 14 when the float head 15 is at the aforementioned lower level 16; the spider 23 is positioned to engage the cylindrical float portion 18 when the float head is at a preselected upper level 26 in the passage. Thus the motion of the float is restricted to a vertical, rectilinear path along the axis of the passage between the levels 16 and 26.

The foregoing structures in a general sense are conventional elements of variable area flowmeters and are adapted to function in the well-known manner of such devices. Accordingly, for use of the meter to measure the rate of liquid flow through a conduit system, the meter tube is connected in upright position in the system (by means of flanges 34, 35) so that the flow of liquid is directed upwardly through the passage 11, entering at an inlet orifice 36 below the passage and exiting through an outlet orifice 37 above the passage.

In operation, as a flow of liquid is thus introduced to the passage, the force of the flow acting on the lower surfaces of the float 12 elevates the float above its lowermost position (level 16) in the passage. The flow passes around the float through the annular space between the float head 15 and the meter tube wall. Owing to the tapered configuration of the passage 11, this annular space increases in area as the float moves upward; consequently, for any given flow rate, elevation of the float is accompanied by a progressive decrease in the upward forces exerted by the flow of the float, and continues only until the float reaches a level at which these upward forces are balanced by the downward force of gravity on the float. The latter level, at which the float remains suspended as long as the flow rate remains constant, is uniquely determined by the flow rate, the vertical float displacement being a substantially linear function of flow rate.

As incorporated in the foregoing flowmeter structure, the present indicating apparatus is arranged to provide, at a locality external to the meter tube 10, continuous indication of the float position as a measure of flow rate through the passage. This apparatus in the form shown includes a first elongated and end-polarized cylindrical permanent magnet 40, i.e. a bar magnet having a diameter substantially smaller than the distance between its magnetic poles, mounted in the cylindrical portion 18 of the float 12 with its magnetic axis oriented along the axis of the passage 11. The magnet 40 (herein termed the float magnet) is carried by the float in the passage along a rectilinear path coincident with the passage axis and with its own magnetic axis; thus as the float moves in the path between levels 16 and 26 the centerpoint 41 of the float magnet moves in a path of equal length defined between corresponding lower and upper levels 43, 44. The midpoint of the latter path is represented in FIG. 2 by level 45.

Also included in the present apparatus, and disposed within a housing 47 external to the meter tube 10, is a second elongated and end-polarized cylindrical permanent bar magnet 48, herein termed the indicator magnet. This magnet 48 is mounted by means of a clamp 50 on one end of a shaft 52 in such position that the shaft axis coincides with a line extending through the geometric centerpoint 53 of the magnet 48 perpendicular to its magnetic axis. The shaft 52 extends through a hollow sleeve 54 fixedly supported in the housing 47, and is held in antifriction bearings 55, 56 (e.g. instrument-quality ball bearings) at opposite ends of the sleeve; thence the shaft extends through a second fixed sleeve member 58. At its outer extremity the shaft carries an indicator needle 59, conveniently oriented in a direction parallel to the magnetic axis of the indicator magnet.

As thus mounted, the magnet 48 is freely pivoted for angular displacement about its centerpoint in a plane of rotation containing its magnetic axis and on an axis of rotation coincident with the shaft axis. The low-friction mounting of the shaft 52 minimizes frictional drag on the magnet 48. To reduce oscillations and overtravel of the indicator magnet and needle resulting from sudden changes in position of the float magnet (to which the indicator magnet is magnetically coupled, as hereinafter explained), a copper eddy current damping cup 60 may be mounted on the end of the sleeve 54 adjacent the magnet 48 to surround the latter magnet so as to encompass with clearance the path of magnet rotation.

The housing 47 also contains a frame 61 supporting an indicator plate 62 which is positioned behind the needle 59 and bears on its face a suitably calibrated dial 64 (shown in FIG. 1). As the magnet 48 rotates, carrying the needle with it, the angular displacement of the needle from a zero position is read on this dial, needle and dial being visible through a transparent port 66 in the housing 47.

The latter housing, containing the above described structures, is mounted on a bracket 68 which is rigidly secured to the meter tube 10 by means of a yoke 70, in such position that the axis of rotation of the indicator magnet 48 lies in the plane of level 45, i.e. the horizontal plane perpendicularly bisecting the path of travel of the float magnet 40. As thus disposed, the indicator magnet 48 is magnetically coupled to the float magnet 40 so that it follows and indicates the displacement of the latter magnet with the float 12 in the passage 11. It will be appreciated that the meter tube 10, float 12, indicator housing 47, and other structures of substantial mass in the vicinity of the two magnets are all fabricated of non-magnetic material so as not to interfere with the desired magnetic coupling.

The manner in which the indicator magnet follows the float magnet, as the float moves under the influence of liquid flow, will now be readily apparent. When there is no flow, and the float 12 is at its lowermost level in the passage 11, the indicator magnet 48 takes a steady zero position, e.g. an axially horizontal position as shown in FIGS. 1–3; assuming, for example, that the upper pole of the float magnet 40 is the north pole and that the needle 59 points in the same direction as the south pole of the indicator magnet, the latter indicator magnet pole and the needle are then directed toward the upper float magnet pole. As the float and float magnet rise, the south pole of the indicator magnet rotates upwardly, following the north pole of the float magnet, until the float magnet reaches the midpoint of its path (with its centerpoint 41 at level 45), at which point the two magnets are aligned in vertically parallel relation with the indicator magnet south pole directed upward. Then as the float and float magnet rise further (i.e. above the level 45) the north pole of the indicator magnet follows the lower (south) pole of the float magnet, producing still further rotation of the indicator magnet. Finally, when the float magnet is at its uppermost position (level 44) the indicator magnet is again axially horizontal, but with its north pole directed toward the float magnet.

Thus, in the apparatus of FIGS. 1–3, each pole of the indicator magnet 48 travels through a 180° arc as the float 12 moves between levels 16 and 26 (i.e. as the float magnet moves between levels 43 and 44). The indicator needle 59 is thereby carried through a 180° arc across the dial 64. This relative motion of float and indicator magnets is illustrated diagrammatically in FIG. 4, wherein the two magnets are shown (solid lines) in vertical parallelism as they are oriented when the float magnet centerpoint 41 is at the midpoint level 45 of its path. As the float magnet 40 moves from its extreme lower position (broken line 72a) to its extreme upper position (broken line 72b), the south pole 73 of the indicator magnet 48 rotates from the position represented by a broken line 73a to the position represented by a broken line 73b (the total angular displacement of the magnet 48 being shown in FIG. 4 as substantially greater than 180°, for clarity of illustration).

In this arrangement, the indicator magnet 48 and needle 59 assume a unique angular position for any given float magnet position, regardless of float magnet starting position or sudden motion due to surges of flow through the passage 11. Consequently, the position of the float 12 is indicated by the angular position of the needle 59 relative to the zero position on the dial 64. Furthermore, since the float position is itself uniquely determined by the flow rate through the passage, the flow rate can be read directly by appropriately calibrating the dial 64 in units of flow rate. The total angular displacement of the indicator magnet 48 (for the total path of travel of the float magnet) may be made less than or greater than 180°, depending upon such factors as the relative dimensions and positions of the two magnets; it is ordinarily desirable that this extent of indicator magnet displacement be comparatively large, i.e. at least approaching 180°, to facilitate readings of float position (or flow rate) on the dial 64.

In the foregoing apparatus, in accordance with the invention, the relative lengths and placement of the two magnets 40 and 48 are selected within certain special limits or ranges of values of relative dimensions, which as previously mentioned constitute important specific features of the invention affording a high degree of linearity of indicator response as well as other advantages. Thus, with magnets having such relative positions and dimensions, angular displacement of the indicator magnet 48 is found to be very nearly linearly proportional to the displacement of the float magnet 40 in the passage 11 over the entire path of float travel, as desired to enable satisfactory indicator scale configuration and to afford high accuracy of flow rate readings throughout the full range of flow rates measured by the meter. These limiting values, and other factors governing the selection of apparatus dimensions for the device of FIGS. 1–3 may be described with refreence to FIGS. 4 and 5, wherein the dimensions involved are represented diagrammatically.

Referring then to FIG. 4, M represents the length of the float magnet path (the distance between levels 43 and 44) in the apparatus of FIGS. 1–3; a typical value for M, in a variable area flowmeter of the type described above, is about 5 inches, e.g. for a meter of 3 inch nominal diameter (nominal diameter being the diameter of the float head 15 in FIG. 2). For suitable linearity, it is found that the length L of the float magnet 40 should be at least about equal to, or greater than, 0.3 times the value of M; thus for M=5 inches, L should equal or exceed 1.5 inches. For flowmeters having the exemplary dimensions mentioned above, float magnets 5 inches or more in length are less convenient than shorter magnets, in that they are difficult to enclose in meter floats and may be undesirably heavy and expensive, although their performance is otherwise satisfactory. Accordingly, a presently preferred upper limit for L is a value of about 1.0M.

In addition, the length L' of the indicator magnet 48 must be substantially less than the float magnet length L. This general proportional relationship between L and L' is a particularly important feature of the invention, contributing very significantly to the attainment of the desired linearity and indicator range. So long as the indicator magnet is appreciably shorter than the float magnet, the relative values of L' and L may vary considerably; specifically, values of indicator magnet length L' equal to between about 0.15 and about 0.67 times the float magnet length L are found to be satisfactory, i.e. for provision of suitable linearity and range.

The magnetic field pattern, which determines linearity of operation, is relatively independent of the float magnet diameter D and indicator magnet diameter D'; hence the values chosen for these diameters are not highly critical, although they should be substantially smaller than the correspnoding magnet lengths to provide elongated magnet configurations. Since magnetic coupling strength is affected by the magnet diameters, D and D' are selected to obtain adequate coupling between the magnets at the spacing between magnets required by the flowmeter dimensions. Space requirements for the magnets are also dependent on the values of these diameters. By way of example, in flowmeters of 3 inch nominal diameter and 5 inch float path length, the float magnet diameter D (for magnets fabricated of commonly available magnetic alloys, properly magnetized) may in practice be between about 3/8 inch and about 3/4 inch. Similarly, with the same flowmeter dimensions, a practical range of values for the indicator magnet diameter D' is that between about ½ inch and about 1 inch. As another example, for flowmeters with nominal diameters as small as ½ inch, each of the diameters D and D' may be as small as about 1/8 inch.

In FIG. 5, r is the distance between the geometric midpoint 53 of the indicator magnet 48 and the axis of the path of the float magnet 40, taken along the line perpendicular to the float magnet path axis drawn from the point 53; as will be understood, the latter line lies in the plane containing the indicator magnet axis of rotation AA and perpendicularly bisecting the float magnet path. The distance $r$ should be of substantial magnitude, since as $r$ approaches 0 increasing deviation from linearity is observed; moreover, especially in flowmeter equipment of the type described, a substantial value of $r$ is necessary to provide adequate spacing between the float and indicator magnets to accommodate the passage 11 and the meter tube and indicator housing structures. Thus a preferred minimum value for $r$ is about 0.3 times the path length M, i.e. a value of about 1.5 inches for a 5 inch path length. The upper limiting value for $r$ is governed only by considerations of coupling strength and desired magnitude of indicator magnet angular displacement, both these factors diminishing with increase of $r$ for a given path length.

The angle $\beta$ in FIG. 5 is that defined between the plane PP of indicator magnet rotation and the aforementioned line perpendicular to the float magnet path axis from the indicator magnet centerpoint 53. The nature of the intersection or coupling of the fields of the two magnets is dependent on $\beta$ as well as on the relative values of $r$, M, L and L'; consequently, the value of $\beta$ is significant for the attainment of suitable linearity. When $\beta = 90°$ (i.e. when the indicator magnet rotational axis AA intersects the float magnet path axis), the indicator magnet rotation is very abrupt, having a stepped relation to the displacement of the float magnet. On the other hand, as $\beta$ approaches 0°, linearity of indication is impaired unless the float magnet length L is at least about equal to the path length M, and there is a concomitant decrease in the total angular displacement of the indicator magnet. In general, for suitable linearity $\beta$ may lie in a range between about 0° and about 60°, a preferred range for $\beta$ being that between about 0° and about 45°.

The line $c$ in FIG. 5 represents the minimum horizontal distance between the periphery of the float magnet path and the nearest adjacent point on the indicator magnet (when the latter is oriented with its magnetic axis in a horizontal plane); as will be appreciated, $c$ is a function of the dimensions L', D, D', $r$ and $\beta$. This length $c$ is the minimum clearance available between the magnets to accommodate the passage 11 meter tube 10 and indicator housing 47 (or equivalent structures, i.e. if the present apparatus is used with equipment other than the flowmeter of FIGS. 1–3). To provide adequate clearance for variable area flowmeter equipment in the arrangement shown in FIGS. 1–3, the aforementioned dimensions should ordinarily be chosen such that $c$ is at least about 3 times as large as the float magnet diameter D.

Owing to the elongate configuration of the magnets, and to the various dimensional relationships above set forth, the present apparatus affords satisfactory coupling strength between magnets over distances ordinarily more than sufficient for the desired clearance; this provision of useful coupling strength over substantial distances constitutes an additional important advantage of the invention.

More particularly, in indicator apparatus as shown in FIGS. 1–3, provision of dimensions in accordance with the foregoing ranges of values enables attainment of a coupling strength between magnets sufficient to reduce frictional errors (i.e. errors in indicator magnet motion due to friction of the bearings 55, 56) to as little as $\pm \frac{1}{3}\%$ of total travel, with magnets and mechanism elements of advantageously small size and weight yet with a clearance between magnets fully adequate to accommodate the flowmeter and indicator housing elements.

By way of further and more specific illustration of the high degree of linearity attainable in the indicator apparatus of the present invention, a maximum angular deviation of indicator magnet motion (from strictly linear relation to float magnet motion) of not more than about $\pm 1\%$ of the total angular motion of the indicator magnet can be achieved with particular combinations of dimensions selected within the general limits or ranges of values set forth above. Specific examples of combinations of dimensions providing the latter degree of linearity are given in Tables I and II below. Individual dimensions within such particular combinations, e.g. as set forth in the following tables, may vary by as much as 2% to 4% without substantial impairment of linearity, making practical the manufacture and assembly of interchangeable parts.

Table I below summarizes experimental results observed in equipment of the type shown in FIGS. 1–3, with a float path length (and float magnet path length M) of 5 inches and an indicator magnet of length L'=1 inch and diameter D'=⅜ inch, for various combinations of float magnet dimensions and values of $r$ and $\beta$ providing maximum deviation from linearity of not more than $\pm 1\%$. In Table I, the total angular travel is the experimentally determined value of the total arc through which the indicator magnet moved as the float magnet moved between the lower and upper extremities of its path. The maximum deviation in degrees is the greatest angular deviation of the indicator magnet position, at any point in its total angular travel, from linear relation to the float magnet position; the percent maximum deviation is the maximum deviation expressed as a percent of the total angular travel.

TABLE I

| L (in.) | D (in.) | r (in.) | β (deg.) | Total Angular Travel (deg.) | Maximum Deviation | |
|---|---|---|---|---|---|---|
| | | | | | Degrees | Percent |
| 2¹⁵⁄₁₆ | ⁵⁄₁₆ | 3³⁄₁₆ | 45 | 159 | ±1.5 | ±1.0 |
| 3½ | ¼ | 2¹⁷⁄₃₂ | 40 | 184 | ±1.5 | ±0.815 |
| 3 | ¼ | 2¹⁹⁄₆₄ | 45 | 202 | ±2.0 | ±1.0 |
| 5 | ⁵⁄₁₆ | 1½ | 0 | 186 | ±0.5 | ±0.27 |
| 6 | ⁵⁄₁₆ | 2⅛ | 0 | 150 | ±1.5 | ±1.0 |

Table II below gives further exemplary values of combinations of float magnet dimensions and parameters $r$ and $\beta$ selected in accordance with the present invention (and providing a maximum angular deviation of not more than $\pm 1\%$), for systems having a 5 inch float magnet path length M and including an indicator magnet of length L'=1 inch and diameter D'=⅜ inch, as suitable for particular variable area flowmeter nominal diameters in the range between ½ inch and 3 inches. Calculated values of the ratios L/M and L'/L are also given for each of the systems of Table II.

TABLE II

| Nominal Meter Size (in.) | L (in.) | D (in.) | L/M | L'/L | r (in.) | β (deg.) |
|---|---|---|---|---|---|---|
| ½, ¾, 1 | 4½ | ⁵⁄₃₂ | .90 | .22 | 1.82 | 16 |
| 1½ | 4⅜ | ³⁄₁₆ | .875 | .23 | 2.36 | 25.4 |
| 2, 3 | 3 | ⅓ | .60 | .33 | 3.10 | 40.1 |

Referring now to FIGS. 6–8, there is illustrated an alternative arrangement for indicating flow rate through a variable area flowmeter with the apparatus of the present invention. The flowmeter of FIGS. 6–8, like that of FIGS. 1–3, includes a meter tube 75 defining a downwardly tapering, axially vertical passage 76 in which a float 77 is arranged for vertical displacement along the rectilinear passage axis, between lower and upper levels respectively designated 79, 80. As before, the float structure includes a float head 82 dimensioned to substantially close the passage when positioned at the lower level 79, together with supporting structure 84. The float further includes a pair of guide rods 86, 87, respectively extending below and above the float along the axis of the passage, and received in guides 88, 89 mounted in the passage respectively below and above the float, the latter guides maintain the float in axial position in the passage and also serve as stops to restrict vertical displacement of the float to a path between levels 79 and 80.

This flowmeter is arranged to function in the same manner as that of FIGS. 1–3. In operation, it is connected in a conduit system so that the fluid flow to be measured advances upwardly through the passage 76 from an inlet opening 90 and leaves the passage through an upper outlet orifice 91. The position of the float 77 in the passage is determined by the flow rate through the passage; hence the flow rate can be ascertained, as before, by observing the float position.

In the structure of FIGS. 6–8, however, the upper, outlet orifice 91 opens horizontally through the side wall of the meter tube 75, and the upper end of the passage 76 is closed by a plate 94. The upper float guide rod 87 is elongated so as to extend above the passage 76, through a sleeve 96 in the plate 94. The float magnet 40 of the present indicating apparatus is mounted at the upper end of the guide rod 87, with its magnetic axis aligned with the axis of the passage 76. Thus, as the float 77 moves along the passage 76, the float magnet is displaced by an equal amount along a rectilinear path coincident with its magnetic axis and entirely above the meter tube 75; specifically, the centerpoint of the magnet 40 moves between lower and upper levels 43, 44 corresponding to the float levels 79, 80 and defining a float magnet path equal in length to the float path. A tube 100 sealed at its upper end closes this float magnet path.

The external indicator mechanism of the present apparatus (including the indicator magnet 48 and needle 59 together with the other above described structures contained within the housing 47, all as shown in FIGS. 1–3) is positioned externally of the tube 100 to provide indication of the position of the float magnet 40, and hence of the float 77. As shown, the indicator housing is secured by a bracket 102 to the tube 100, in such position that the axis of rotation of the indicator magnet 48 lies in a plane perpendicularly bisecting the path of travel of the float magnet, i.e. in the plane of level 45 which represents the midpoint of the latter path.

As thus arranged, the indicator apparatus functions in the device of FIGS. 6–8 in the same manner as in the device of FIGS. 1–3 to indicate the rate of fluid flow through the flowmeter tube, the indicator magnet 48 being magnetically coupled to the float magnet so that displacement of the latter with the float 77 produces a corresponding angular displacement of the indicator magnet and needle 59. Because the float magnet is positioned above rather than within the flowmeter tube, the clearance (c) between the magnets may be substantially smaller than in the arrangment shown in FIGS. 1–3. In other respects, however, the positions and dimensions of the two magnets relative to each other and to the float magnet path are as described above in connection with FIGS. 4 and 5, and again serve to provide superior linearity of indicator response (with a maximum deviation from linearity, as described above, of not more than about ±1% over the entire path of float travel) together with the large angular extent or range of indicator travel and other advantages previously mentioned.

The above-described indicator apparatus may also be used with equipment other than flowmeters to indicate the position of a rectilinearly movable element. Thus, for example, the present apparatus may be employed in a liquid level gauge having a vertically movable float the position of which is representative of the liquid level to be determined. In each such case, the float magnet 40 is carried by the movable element for axially directed rectilinear displacement therewith, and the disposition of the indicator magnet and the positional and dimensional relationships of the two magnets are as previously described and shown, again providing superior linearity of indicator motion and other advantages.

It is to be understood that the invention is not limited to the features and embodiments hereinabove specifically set forth, but may be carried out in other ways without departure from its spirit.

I claim:

1. In apparatus for indicating the position of an element which is displaceable along a rectilinear path of ascertained length M, in combination, a first elongated and end-polarized magnet of length equal to at least about 0.3M, carried by said element for axially directed rectilinear movement therewith along a magnet path having said length M; and a second elongated and end-polarized magnet having a length between poles equal to between about 0.15 and about 0.67 times the length between poles of said first magnet, mounted for angular displacement about an axis of rotation extending through its midpoint and perpendicular to its magnetic axis so that its plane of rotation contains its magnetic axis, and disposed adjacent said magnet path in spaced relation thereto, with said axis of rotation lying in a plane perpendicularly bisecting said magnet path and said plane of rotation oriented at an angle of not more than about 60° to the line perpendicular to the axis of said magnet path drawn from said second-magnet midpoint, such that said second magnet is magnetically coupled to said first magnet to undergo angular displacement as aforesaid responsive to and in substantially linear proportion to displacement of said first magnet along said magnet path.

2. In apparatus for indicating the position of an element which is displaceable along a rectilinear path of ascertained length M, in combination, a first bar magnet having a length L between poles equal to at least about 0.3M and a diameter substantially smaller than its length, carried by said element for axially directed rectilinear movement therewith along a magnet path having said length M; a second bar magnet having a length between poles equal to between about 0.15L and about 0.67L and a diameter substantially smaller than its length; and means supporting said second magnet and adapted to permit angular displacement of said second magnet about an axis of rotation extending through its midpoint and perpendicular to its magnetic axis so that its plane of rotation contains its magnetic axis, said magnet-supporting means being disposed to position said second magnet adjacent said magnet path in spaced relation thereto, with said axis of rotation lying in a plane perpendicularly bisecting said magnet path and said plane of rotation oriented at an angle of not more than about 60° to the line perpendicular to the axis of said magnet path drawn from said second-magnet midpoint, such that said second magnet is magnetically coupled to said first magnet to undergo angular displacement as aforesaid responsive to and in substantial linear proportion to displacement of said first magnet along said magnet path, the distance between said second magnet midpoint and said axis of said magnet path along said line being equal to at least about 0.3M.

3. In a system having structure defining a laterally enclosed passage and including an element disposed in said passage and adapted to undergo rectilinear displacement therein along a path of ascertained length M, apparatus for indicating at a locality external to said passage the position of said element therein, said apparatus comprising, in combination: a first bar magnet having a length L between poles equal to at least about 0.3M and a diameter substantially smaller than its length, carried by said element for axially directed rectilinear movement therewith along a magnet path having said length M; and a second bar magnet having a length between poles equal to between about 0.15L and about 0.67L and a diameter substantially smaller than its length, mounted for angular displacement about an axis of rotation extending through its midpoint and perpendicular to its magnetic axis so that its plane of rotation contains its magnetic axis, and disposed externally of said passage adjacent said magnet path in spaced relation thereto, with said axis of rotation lying in a plane perpendicularly bisecting said magnet path and said plane of rotation oriented at an angle of not more than about 60° to the line perpendicular to the axis of said magnet path drawn from said second-magnet midpoint, such that said second magnet is magnetically coupled to said first magnet to undergo angular displacement as aforesaid responsive to and in substantially linear proportion to displacement of said first magnet along said magnet path.

4. In a system having structure defining a laterally enclosed passage and including an element disposed in said passage and adapted to undergo rectilinear displacement therein along a path of ascertained length M, apparatus for indicating at a locality external to said passage the position of said element therein, said apparatus comprising, in combination: a first elongated and end-polarized magnet of length L equal to at least about 0.3M, carried by said element for axially directed rectilinear movement therewith along a magnet path having said length M; a second elongated and end-polarized magnet of length equal to between about 0.15L and about 0.67L; and means supporting said second magnet and adapted to permit angular displacement of said second magnet about an axis of rotation extending through its midpoint and perpendicular to its magnetic axis so that its plane of rotation contains its magnetic axis, said magnet-supporting means being disposed externally of said passage to position said second magnet adjacent said magnet path in spaced relation thereto, with said axis of rotation lying in a plane perpendicularly bisecting said magnet path and said plane of rotation oriented at an angle of not more than about 45° to the line perpendicular to the axis of said magnet path drawn from said second-magnet midpoint, such that said second magnet is magnetically coupled to said first magnet to undergo angular displacement as aforesaid responsive to and in substantially linear proportion to displacement of said first magnet along said magnet path, the displacement between said second-magnet midpoint and said axis of said magnet path being equal to at least about 0.3M.

5. In a system having structure defining a laterally enclosed passage and including an element disposed in said passage and adapted to undergo rectilinear displacement therein along a path of ascertained length M, apparatus for indicating at a locality external to said passage the position of said element therein, said apparatus comprising, in combination: a first elongated and end-polarized magnet of length L equal to at least about 0.3M, mounted in said element for axially directed rectilinear movement therewith in said passage along a magnet path having said length M; a second elongated and end-polarized magnet of length equal to between about 0.15L and about 0.67L; and means supporting said second magnet and adapted to permit angular displacement of said second magnet about an axis of rotation extending through its midpoint and perpendicular to its magnetic axis so that its plane of rotation contains its magnetic axis, said magnet-supporting means being disposed externally of said passage to position said second magnet adjacent said passage in spaced relation thereto with said axis of rotation lying in a plane perpendicularly bisecting said magnet path and said plane of rotation oriented at an angle of not more than about 60° to the line perpendicular to the axis of said magnet path drawn from said second-magnet midpoint, such that said second magnet is magnetically coupled to said first magnet to undergo angular displacement responsive to and in substantially linear proportion to displacement of said first magnet along said magnet path.

6. In a system having structure defining a laterally enclosed passage and including an element disposed in said passage and adapted to undergo rectilinear displacement therein along a path of ascertained length M, apparatus for indicating the position of said element in said passage, said apparatus comprising, in combination: a member integral with said element and extending therefrom coaxially with said passage to a locality external to said passage; a first bar magnet having a length L between poles equal to at least about 0.3M and a diameter substantially smaller than its length, mounted in said member to undergo axially directed rectilinear movement with said element along a magnet path in said locality having said length M; a second bar magnet having a length between poles equal to between about 0.15L and about 0.67L and a diameter substantially smaller than its length; and means supporting said second magnet and adapted to permit angular displacement of said second magnet about an axis of rotation extending through its midpoint and perpendicular to its magnetic axis so that its plane of rotation contains its magnetic axis, said magnet-supporting means being disposed externally of said locality to position said second magnet adjacent said locality in spaced relation thereto with said axis of rotation lying in a plane perpendicularly bisecting said magnet path and said plane of rotation oriented at an angle of not more than about 60° to the line perpendicular to the axis of said magnet path drawn from said second-magnet midpoint, such that said second magnet is magnetically coupled to said first magnet to undergo angular displacement as aforesaid responsive to and in substantially linear proportion to displacement of said first magnet along said magnet path.

7. In a system having structure defining an axially rectilinear laterally enclosed passage and including an element disposed in said passage and adapted to undergo rectilinear displacement therein along a path of ascertained length M, apparatus for indicating at a locality external to said passage the position of said element therein, said apparatus comprising, in combination: a first elongated and end-polarized magnet of length L equal to at least about 0.3M, carried by said element for axially directed rectilinear movement therewith along a magnet path having said length M; a second elongated and end-polarized magnet of length equal to between about 0.15L and about 0.67L; means supporting said second magnet and adapted to permit angular displacement of said second magnet about an axis of rotation extending through its midpoint and perpendicular to its magnetic axis so that its plane of rotation contains its magnetic axis, said magnet-supporting means including a shaft fixedly connected to said second magnet and extending therefrom along said axis of rotation, and bearing means journalling said shaft, said bearing means being disposed externally of said passage to position said second magnet adjacent said magnet path in spaced relation thereto with said axis of rotation lying in a plane perpendicularly bisecting said magnet path and said plane of rotation oriented at an angle of not more than about 60° to the line perpendicular to the axis of said magnet path drawn from said second-magnet midpoint, such that said second magnet is magnetically coupled to said first magnet to undergo angular displacement as aforesaid responsive to and in substantially linear proportion to displacement of said first magnet along said magnet path; and means operatively connected to said shaft for indicating the angular position of said second magnet.

8. In a variable area flowmeter, in combination, a tube defining an axially rectilinear tapering passage for fluid flow; a float disposed in said passage and adapted to undergo displacement therein, responsive to variations in rate of fluid flow through said passage, along a rectilinear path of ascertained length M; a first elongated and end-polarized magnet having a length L equal to at least about 0.3M, mounted in said float to undergo axially directed rectilinear movement therewith in said passage along a magnet path having said length M; and a second elongated and end-polarized magnet of length equal to between about 0.15L and about 0.67L, mounted for angular displacement about an axis of rotation extending through its midpoint and perpendicular to its magnetic axis so that its plane of rotation contains its magnetic axis, and disposed adjacent said tube in spaced relation thereto, with said axis of rotation lying in a plane perpendicularly bisecting said magnet path and said plane of rotation oriented at an angle of not more than about 60° to the line perpendicular to the axis of said magnet path drawn from said second-magnet midpoint, such that said second magnet is magnetically coupled to said first magnet to undergo angular displacement as aforesaid responsive to and in substantially linear proportion to displacement of said first magnet along said magnet path.

9. In a variable area flowmeter, in combination, a tube defining an axially rectilinear tapering passage for fluid flow; a float disposed in said passage and adapted to undergo displacement therein, responsive to variations in rate of fluid flow through said passage, along a rectilinear path of ascertained length M; a first bar magnet having a length L between poles equal to at least about 0.3M and a diameter D substantially smaller than its length, mounted in said float to undergo axially directed rectilinear movement therewith in said passage along a magnet path having said length M; a second bar magnet having a length between poles equal to between about 0.15L and about 0.67L and a diameter substantially smaller than its length; and means supporting said second magnet and adapted to permit angular displacement of said second magnet about an axis of rotation extending through its midpoint and perpendicular to its magnetic axis so that its plane of rotation contains its magnetic axis, said magnet-supporting means being disposed externally of said tube to position said second magnet adjacent said tube in spaced relation thereto with said axis of rotation lying in a plane perpendicularly bisecting said magnet path and said plane of rotation oriented at an angle of not more than about 60° to the line perpendicular to the axis of said magnet path drawn from said second-magnet midpoint, such that said second magnet is magnetically coupled to said first magnet to undergo angular displacement as aforesaid responsive to and in substantially linear proportion to displacement of said first magnet along said magnet path; the diameter D of said first magnet and the dimensions and position of said second magnet being mutually selected to provide a minimum clearance between said first and second magnets to at least about 3D.

10. In a variable area flowmeter, in combination, a tube defining an axially vertical and downwardly tapering passage for fluid flow; a float disposed in said passage and adapted to undergo displaement therein, responsive to variations in rate of fluid flow through said passage, along a vertical path of ascertained length M; a first bar magnet having a length L between poles equal to between about 0.3M and about 1.0M and a diameter D substantially smaller than ts length, mounted in said float to undergo axially directed vertical movement therewith in said passage along a magnet path having said length M; a second bar magnet having a length between poles equal to between about 0.15L and about 0.67L and a diameter substantially smaller than its length; means supporting said second magnet so as to permit angular displacement of said second magnet about an axis of rotation extending through its midpoint and perpendicular to its magnetic axis so that its plane of rotation contains its magnetic axis, said magnet-supporting means being disposed externally of said tube to position said second magnet adjacent said tube in spaced relation thereto with said axis of rotation lying in a plane perpendicularly bisecting said magnet path and said plane of rotation oriented at an angle of not more than about 45° to the line perpendicular to the axis of said magnet path drawn from said second-magnet midpoint, such that said second magnet is magnetically coupled to said first magnet to undergo angular displacement as aforesaid responsive to and in substantially linear proportion to displacement of said first magnet along said magnet path, the distance between said second-magnet midpoint and said axis of said magnet path along said line being equal to at least about 0.3M; and means operatively connected to said second magnet for indicating the angular position of said second magnet; the diameter D of said first magnet and the dimensions and position of said second magnet being mutually selected to provide a minimum clearance between said first and second magnets equal to at least about 3D.

11. Apparatus as defined in claim 9, wherein said magnet-supporting means includes a shaft fixedly connected to said second magnet and extending therefrom along said axis of rotation, and bearing means fixedly connected to said tube and journalling said shaft; and wherein said indicator means includes an indicating element mounted on said shaft for angular displacement therewith.

12. In a variable area flowmeter, in combination, a tube defining an axially rectilinear tapering passage for fluid flow; a float disposed in said passage and adapted to undergo displacement therein, responsive to variations in rate of fluid flow through said passage, along a rectilinear path of ascertained length M, said float having a portion extending coaxially with said passage to a locality external to said passage; a first elongated and end-polarized magnet having a length L equal to at least about 0.3M, mounted in said float portion to undergo axially directed rectilinear movement therewith along a magnet path in said locality having said length M; a second elongated and end-polarized magnet of length equal to between about 0.15L and about 0.67L; means supporting said second magnet and adapted to permit angular displacement of said second magnet about an axis of rotation extending through its midpoint and perpendicular to its magnetic axis so that its plane of rotation contains its magnetic axis, said magnet-supporting means being disposed externally of said locality to position said second magnet adjacent said locality in spaced relation thereto with said axis of rotation lying in a plane perpendicularly bisecting said magnet path and said plane of rotation oriented at an angle of not more than about 60° to the line perpendicular to the axis of said magnet path drawn from said second-magnet midpoint, such that said second magnet is magnetically coupled to said first magnet to undergo angular displacement as aforesaid responsive to and in substantially linear proportion to displacement of said first magnet along said magnet path; and means operatively connected to said second magnet for indicating the angular position of said second magnet.

References Cited by the Examiner

UNITED STATES PATENTS

| | | | |
|---|---|---|---|
| 1,040,127 | 10/1912 | Bonesteel | 73—319 |
| 2,564,676 | 8/1951 | Crouse | 310—104 X |
| 2,634,608 | 4/1953 | Sorber. | |
| 3,137,165 | 6/1964 | Harris | 73—209 |
| 3,167,694 | 1/1965 | Bekedam. | |
| 3,164,989 | 3/1965 | Busillo et al. | 73—209 |

FOREIGN PATENTS

| | | |
|---|---|---|
| 871,203 | 3/1953 | Germany. |

References Cited by the Applicant

UNITED STATES PATENTS

| | | |
|---|---|---|
| 1,499,839 | 7/1924 | Nicholson. |
| 1,520,985 | 12/1924 | Troseth. |
| 2,260,516 | 10/1941 | Gerber. |
| 2,383,758 | 8/1945 | Ziebolz. |
| 2,386,643 | 10/1945 | Wallace. |
| 2,425,691 | 8/1947 | Brewer. |
| 2,514,907 | 7/1950 | Stewart. |
| 2,574,866 | 11/1951 | Fahrlander. |
| 3,005,342 | 10/1961 | Head. |

RICHARD C. QUEISSER, *Primary Examiner.*

E. D. GILHOOLY, *Assistant Examiner.*